Aug. 8, 1950    S. S. BROWN    2,517,836
BRUSH LIFTING MECHANISM FOR ELECTRIC MOTORS
Filed Nov. 14, 1947    3 Sheets-Sheet 2

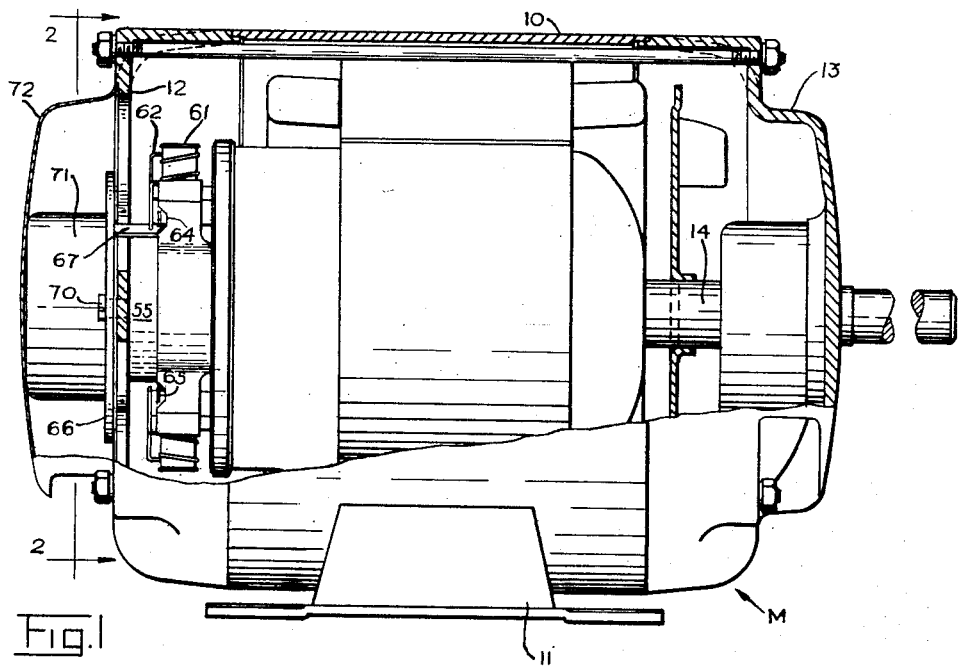

INVENTOR
STEFFEN S. BROWN
BY
Toulmin & Toulmin
ATTORNEYS

INVENTOR
STEFFEN S. BROWN
BY
Toulmin & Toulmin
ATTORNEYS

Patented Aug. 8, 1950

2,517,836

UNITED STATES PATENT OFFICE 2,517,836

BRUSH LIFTING MECHANISM FOR ELECTRIC MOTORS

Steffen S. Brown, Dayton, Ohio, assignor to The Brown-Brockmeyer Company, Dayton, Ohio, a corporation of Ohio Application November 14, 1947, Serial No. 786,089

5 Claims. (Cl. 172—279)

The present invention relates to electric motors and is concerned primarily with the brush lifting and short circuited devices that are incorporated into certain types of electric motors.

A type of motor which is now meeting with an appreciable amount of acceptance from the using public starts as a repulsion motor and after a predetermined speed is achieved, changes in operating characteristics to an induction motor. While operating as a repulsion motor, the brushes engage the commutator bars. However, when the change over to the induction motor is made the brushes are lifted from the commutator bars and the latter are short circuited.

An important object of the invention lies in the provision of a new and improved brush lifting mechanism.

While there has been proposed certain devices for short circuiting the commutator bars coincident with the lifting of the brushes, the now known devices of this type are unsatisfactory in that the short circuiting is attended by arcing to an undesirable degree. With this condition in mind a further object of the invention is the provision in an electric motor of new and improved means for short circuiting the commutator bars as the brushes are lifted.

In carrying out the above noted objectives an axially movable brush holder is employed. In one position of this brush holder the brushes are in engagement with the commutator bars and upon axial movement from this position the brushes are lifted from the commutator bars and at the same time the latter are short circuited.

Another important object of the present invention is the provision in an electric motor of the type aforesaid of new and improved means for causing axial shifting of the brush holder.

In attaining this end a centrifugal governor device is employed. This device consists of a series of pairs of weights that are angularly spaced about the motor shaft and drivably connected thereto. As the speed of rotation of the motor shaft increases, each pair of weights is caused to be spread or expand and thereby move the brush holder axially.

Various other and more detailed objects and advantages of the invention such as arise in connection with carrying out the above noted idea in a practical embodiment will in part become apparent and in part be hereinafter stated as the description of the invention proceeds.

The invention, therefore, comprises a new and improved brush lifter, commutator bar short circuiting device, and actuating mechanism therefor for an electric motor that is designed to change from a repulsion motor to an induction motor upon the attainment of a certain predetermined speed.

For a full and more complete understanding of the invention, reference may be had to the following description and accompanying drawings wherein:

Figure 1 is a side view of an electric motor including the brush lifter and short circuiting devices of this invention. In this view part of the motor casing is shown in elevation while other parts have been broken away and shown in section;

Figure 2 is an end view with a portion of the casing shown in section. This view is taken about on the plane represented by the line 2—2 of Figure 1;

Figure 3:
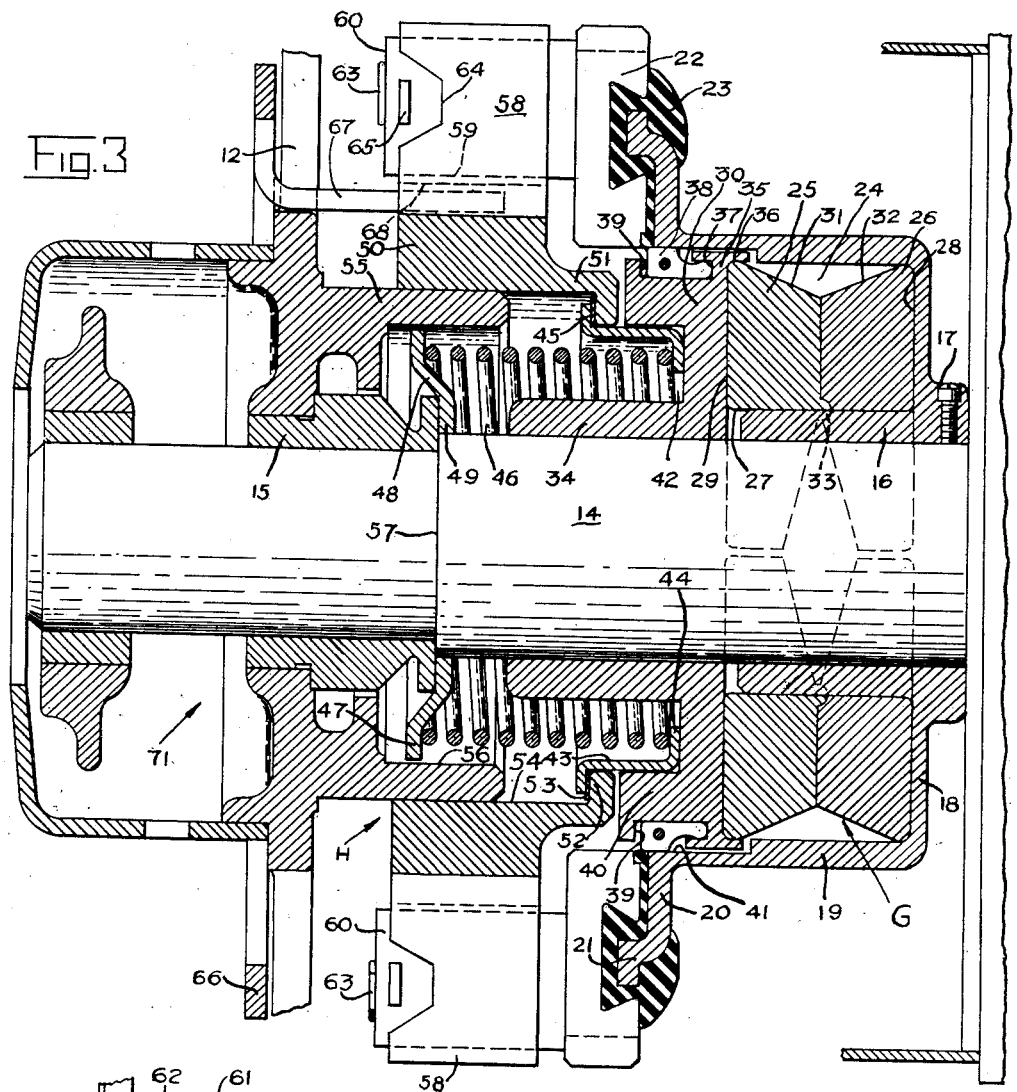
Figure 3 is an enlarged detailed view taken as an axial section through that portion of the motor with which this invention is concerned. This view is taken about on the plane represented by the line 3—3 of Figure 2.

Referring now to the drawings wherein like reference characters denote corresponding parts and first more particularly to Figure 1, an electric motor is identified in its entirety by the reference character M. The motor M is shown as comprising a main casing 10 that is supported from a base 11.

The casing 10 includes end walls 12 and 13 which are provided with bearings for the motor shaft that is designated 14. Thus, the end wall 12 is cut away to provide a spider-like structure that supports the bearing 15 shown in Figures 3 and 5. The open spaces of this spider afford access to the brush mechanism that is located within the casing.

For the purposes of this invention it is deemed unnecessary to illustrate or describe the arrangement of armature and coils for exciting the magnetic field and which arrangement causes rotation of the motor shaft 14. Such arrangements are old and well-known in this art. It suffices to point out that when the motor is started into operation it functions as a repulsion motor and after the shaft 14 has achieved a certain predetermined speed, the motor changes to operate on the principles of an induction motor. This change is accomplished by the mechanism now to be described.

A sleeve 16 is drivably mounted on the shaft 14 so as to rotate therewith. One end of the sleeve 16 terminates in a large hub 17 and carried by the hub 17 is a cup-shaped member made up of a flat end wall 18 that is integrally joined to the hub 17 and a cylindrical wall 19. At the end remote from the end wall 18 the cylindrical wall 19 is formed with an outwardly extending flange 20 which has an off-set peripheral portion 21. Carried by this flange 20 are commutator bars 22 which are insulated from the flange 20 by the mountings of insulation shown at 23.

The sleeve 16, end wall 18, and cylindrical wall 19 define an annular recess 24 in which is mounted a governor assembly that is referred to in its entirety by the reference character G. This governor assembly consists of a series of pair of weights, each pair being made up of the complemental weights 25 and 26. In the position shown in Figure 3 the weights 25 and 26 have inner surfaces 27 which engage the outer surface of the sleeve 16. The weight 26 has an end surface 28 that engages the inner side of the end wall 18. The weight 25 has an end surface 29 which engages a corresponding surface on a radial wall 30 of a member about to be described. The member 25 has an outer conical surface 31 while the weight 26 has a corresponding outer conical surface 32.

Figure 5:
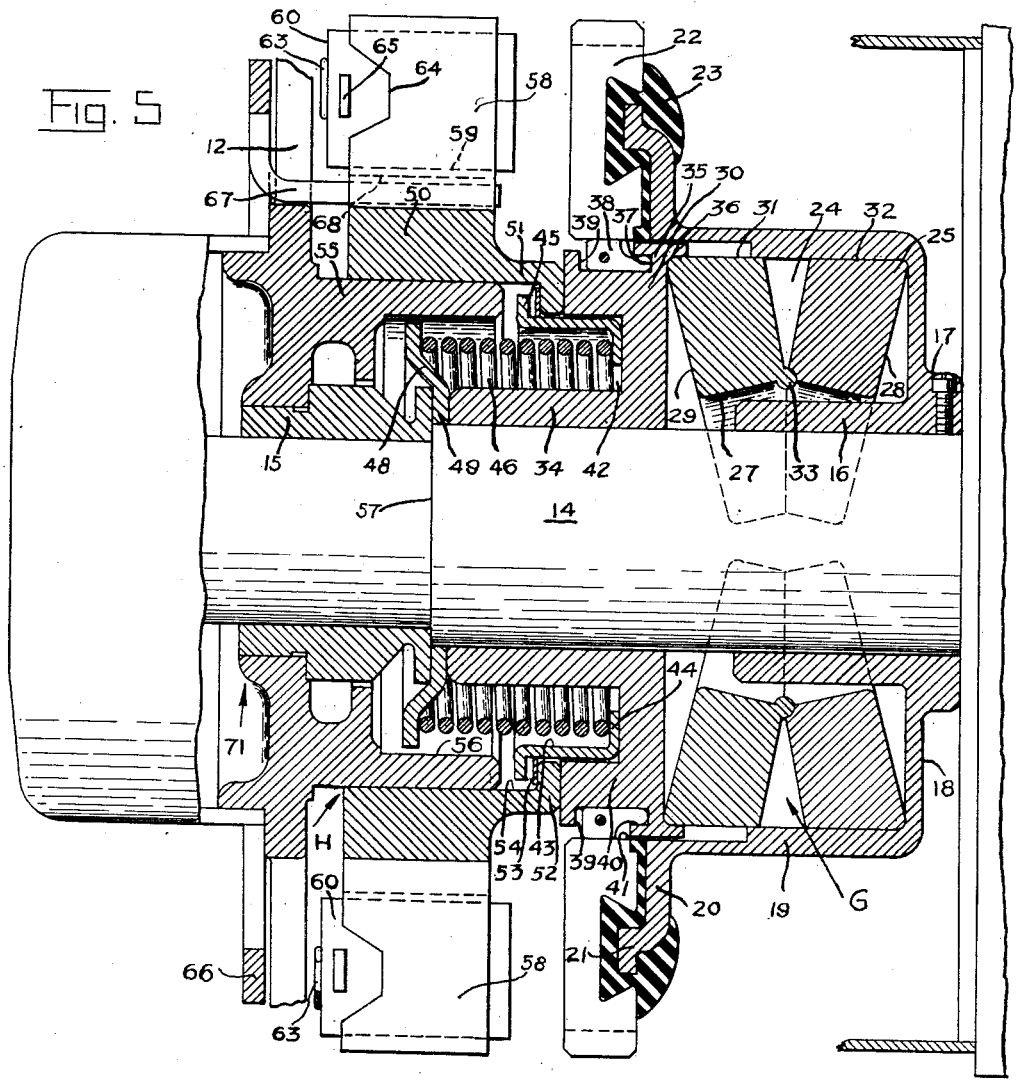
Figure 5 is a sectional view similar to Figure 3 but showing the brushes in their raised position and with the commutator bar short circuited.

The weights 26 and 25 are hingedly connected by the construction shown at 33. It is evident that as the speed of rotation of the shaft 14 increases, the weights 25 and 26 will also rotate at this increased speed. Due to the attending increase in centrifugal force the center of gravity of these weights will move outwardly. This outward movement is accompanied by the expansion which is depicted in Figure 5.

A cylindrical member 34 is formed integrally with the radial wall 30 and is drivably mounted on the shaft 14. The outer edge of the radial wall 30 takes the form of a T-shaped flange 35 which defines a rounded pocket 36 that receives the correspondingly rounded edge of the weights 25. The other side of the T-shaped flange 35 provides an annular recess 37 in which are received the end of contact members 38.

These contact members 38 are mounted in an annular recess 39 that is formed in a cylindrical wall 40 that is carried by the radial wall 30. In the position shown in Figure 3 the contact members 38 engage the inner surface of the cylindrical wall 19 which has been cut away to provide an enlarged bore at 41. It is this enlarged bore which is engaged by the contacts 38. However, when the member 30—34—40 is moved axially into the position shown in Figure 5, the contacts 38 engage the commutator bars 22.

The cylindrical member 34, radial wall 30, and cylindrical wall 40 define a recess 42 in which is positioned a spring follower 43. This spring follower 43 includes an inwardly extending flange 44 at one end and which abuts the radial wall 30. At its other end the spring follower 43 is formed with an out-turned flange 45.

A coil spring 46 is disposed in the recess 42 and engages the flange 44 of the spring follower 43 at one end. At its other end it engages the outer peripheral flange 47 of another spring follower 48 that has an inner flange 49 that has an opening receiving the shaft 14.

A brush holder is identified in its entirety by the reference character H and comprises an annular ring-like member 50 having at one end an extension 51 formed with an inwardly extending flange 52 which has a central opening that receives the spring follower 43. A washer shown at 53 may be interposed between the flange 52 and the flange 45 of the spring follower 43. The ring 50 is formed with an annular bore 54 which slidably receives a cylindrical extension 55 that extends inwardly from the spider structure of the end wall 12. This extension 55 has a bore 56 in which is received the spring follower 48. The spring 46 extends up into the bore 56. At this point it is well to note that the shaft 14 is formed with a shoulder at 57 which engages the bearing 15.

Extending outwardly from the ring-like part 50 of the brush holder H are a plurality of tab-like extensions 58, each of which is formed with a recess 59 which receives a brush 60.

Figure 4:
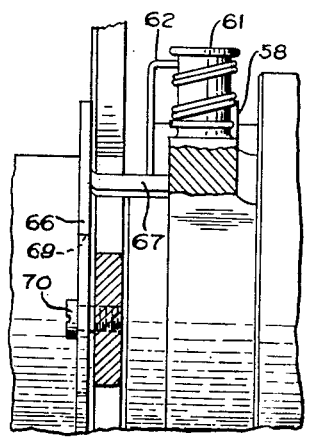
Figure 4 is a detailed view partly in elevation and partly in section of a portion of the brush holder and parts immediately associated therewith.

In the form of the invention illustrated in the drawings there are four brushes 60 and, hence, four tab-like extensions 58. In order to yieldably urge the brushes 60 inwardly against the commutator bars 22 spring devices are employed. As shown in Figures 2 and 4, the ring 50 carries a pair of posts 61 at diametrically opposite points. Each of these posts 61 carries a pair of wire springs 62. Each wire spring 62 has a section that is coiled about the post and a curled-over end 63 that overlies the respective brush 60. The effect of each spring 62 is to urge the brush it engages inwardly into contact with the commutator bars 22. As shown in Figures 3 and 5, inward movement of the brushes may be limited by a shoulder 64, that is formed at the bottom of a cut-out recess, and each extension 58 and a lug 65, that is adapted to engage with the shoulder 64, upon reaching an inward limit of movement.

A ring 66 carries a finger 67 which extends inwardly through one of the recesses of the spider construction of the end wall 12 and the inner portion of this ring is positioned within a slot 68 formed in the brush holder H. The purpose of the ring 66 is for adjusting the annular position of the brush holder. As shown in Figure 2, the ring 66 is formed with a pair of diametrically opposite arcuate slots 69 and set screws 70 which are carried by the end wall 12 and extend through these slots. When these set screws are tightened the ring 66 is held against rotation and the brush holder H is also held. However, the set screws 70 may be loosened to permit adjustment of the brush holder.

An end bearing structure referred to generally as 71 is carried by the end wall 12 and is enclosed by a removable end casing 72 which also closes the recesses in the end wall 12. It is this casing 72 that is removed when it is desired to obtain access to the brush holder.

Operation

While the operation of the above described mechanism is believed to be obvious and readily understandable from the foregoing description, it is noted that the starting and low speed position of the motor is depicted in Figure 3. In this position the weights 25 and 26 of the governor G are collapsed and in their most compact position. The brushes 60 engage the commutator bars 22 and the contacts 38 are out of engagement with the bars 22.

As the speed of the motor increases, the governor G is affected to cause an expansion of the weights 25 and 26. As these weights expand into the position shown in Figure 5, the member made up of the radial wall 30, cylindrical member 34, and cylindrical wall 40 is moved outwardly or to the left, speaking with reference to the showing of the drawings.

This movement is made in opposition to the tendency of the spring 46. However, as this outward movement takes place the wall 40 engages the flange 52 of the brush holder H and moves the latter axially with a telescopic action with respect to the extension 55. As this movement is continued, the brushes 60 are lifted from the commutator bars 22. At the same time the cylindrical wall 40 has also been moved into a position in which the contacts 38 engage the commutator bars 22. This engagement short circuits the bars and the motor now operates as an induction motor.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In an electric motor including a motor shaft, commutator bars, an axially movable brush holder and brushes carried by said brush holder; a cup-shaped member having an extending portion for supporting said commutator bars rotatably mounted with said motor shaft and containing a recess, mechanism for actuating said brush holder and short circuiting said bars, said mechanism comprising an annular member mounted for axial movement on said motor shaft, a plurality of pairs of complemental expansible weights surrounding said shaft and substantially filling said recess, said weights of each pair being connected at their inner faces substantially adjacent said shaft and having outer surfaces one of which engages a portion of said cup-shaped member, said annular member having an end surface that engages the other outer surface of said weights of each pair, contact members carried by said annular member normally in contact with said cup-shaped member, said annular member having a recess therein for receiving one end of a normally spring biased follower member, said brush holder being in substantially abutting relationship with said annular member, said follower member engaging said brush holder at its other end to normally position said brushes against said commutator bars, said weights having shapes such that when the centrifugal force produced by the motor shaft exceeds a pre-determined amount the weights will expand substantially entirely in an axial direction within the recess defined by said cup-shaped member to move said annular member and said brush holder a sufficient axial distance to lift said brushes away from said commutator bars and to position said contact member in direct engagement with and thereby short circuiting said commutator bars.

2. In an electric motor including a motor shaft, commutator bars, an axially movable brush holder and brushes carried by said brush holder; a cup-shaped member having an extending portion for supporting said commutator bars mounted with said motor shaft and containing a recess, mechanism for actuating said brush holder and short circuiting said bars, said mechanism comprising an annular member mounted for axial movement on said motor shaft, a plurality of pairs of complemental expansible weights surrounding said shaft and substantially filling said recess, said weights of each pair being hingedly connected at their inner faces substantially adjacent said shaft and having outer surfaces one of which engages a portion of said cup-shaped member, said annular member having a flanged end surface that engages the other outer surface of said weights of each pair, contact members carried by said annular member normally in contact with said cup-shaped member, said annular member having a recess therein for receiving one end of a normally spring biased follower member, said brush holder being in substantially abutting relationship with said annular member, said follower member engaging said brush holder at its other end to normally position said brushes against said commutator bars, said weights having shapes such that when the centrifugal force produced by the motor shaft exceeds a predetermined amount the weights will expand substantially entirely in an axial direction within the recess defined by said cup-shaped member to move said annular member, said normally biased follower member and said brush holder a sufficient axial distance to lift said brushes away from said commutator bars and to position said contact member in direct engagement with and thereby short circuiting said commutator bars.

3. In an electric motor including a motor shaft, commutator bars, an axially movable brush holder and brushes carried by said brush holder; a sleeve rotatably mounted on said motor shaft, a cup-shaped member carried by said sleeve and cooperating therewith to define a recess, said cup-shaped member having an extending flange portion for supporting said commutator bars, mechanism for actuating said brush holder and short circuiting said bars, said mechanism comprising an annular member rotatably and slidably mounted on said shaft, a series of pairs of complemental expansible weights surrounding said shaft and substantially filling said recess, said weights of each pair being hingedly connected at their inner faces adjacent said sleeve and having outer end surfaces one of which engages a portion of said cup-shaped member, said annular member having a flanged end surface that receives the other end surface of said each pair of weights, contact members carried by said annular member normally in contact with said cup-shaped member, said annular member having a recess therein, a follower member having one end thereof normally spring biased in said recess of said annular member, said brush holder having a flange in substantially abutting relation with said annular member, said follower member engaging said flange of said brush holder to normally position said brushes against said commutator bars, said weights having shapes such that when the centrifugal force produced by the motor shaft exceeds a predetermined amount the weights will expand substantially entirely in an axial direction within the recess defined by said cup-shaped member and said sleeve to move said annular member, said normally biased follower member and said brush holder a sufficient axial distance to lift said brushes away from said commutator bars and to position said contact member in direct engagement with and thereby short circuiting said commutator bars.

4. In an electric motor including a motor shaft, commutator bars, an axially movable brush holder and means carried by said brush holder and engaging said commutator bars, said brush ring being mounted about said shaft for free reciprocation relative thereto axially, mechanism for actuating said brush holder, said mechanism comprising a cup-shaped member surrounding the shaft and containing a recess, a shiftable annular member mounted on the shaft and extending into the open end of the cup-shaped member, a plurality of arcuate weights loosely mounted in said recess surrounding the shaft and substantially filling said recess circumferentially, said weights engaging the wall of the recess at their outer corners adjacent the bottom of the recess, so that when the centrifugal force produced on the weights by the rotation of the shaft exceeds a predetermined amount, the weights will rock about their outer corners and expand in the axial direction within said recess, said annular member being resiliently urged toward said weights whereby the said expansion of the weights will move the annular member in the said axial direction, contacts carried in an annular path by said annular member about the outer periphery, said contacts being normally out of alignment with said commutator bars but adapted to contact the bars when the weights expand and move said annular member axially, said annular member having a lost motion connection with said brush holder for movement thereof in both directions.

5. In an electric motor including a motor shaft, commutator bars, a freely axially movable brush holder and brushes carried by said brush holder; a member having an extending portion for supporting said commutator bars rotatably mounted with said motor shaft and containing a recess, said recess having an annular corner part between the side and bottom walls thereof, mechanism for actuating said brush holder and short circuiting said bars, said mechanism comprising an annular member mounted for axial movement on said motor shaft, a plurality of arcuate weights loosely disposed in said recess surrounding said shaft and said weights substantially filling said recess circumferentially, each of said weights having surfaces one of which engages the said corner of said recess, said annular member having an end surface that engages another surface of said weights, contact members carried by said annular member, said annular member being normally spring biased toward said weights and having a lost motion connection with said brush holder so as to normally position said brushes against said commutator bars, said weights having shapes such that when the centrifugal force produced by the motor shaft exceeds a predetermined amount the weights will expand within the recess defined by said member to move said annular member and said brush holder a sufficient axial distance to lift said brushes away from said commutator bars and to position said contact member in direct engagement with and thereby short circuiting said commutator bars, said brush ring being actuated solely by its lost motion connection with said member.

STEFFEN S. BROWN.

REFERENCES CITED

The following references are of record in the file of this patent:

UNITED STATES PATENTS

| Number | Name | Date |
|---|---|---|
| 1,090,328 | Mills | Mar. 17, 1914 |
| 1,093,074 | Pillsbury | Apr. 14, 1914 |
| 1,933,760 | Ringwald | Nov. 7, 1933 |